United States Patent [19]

Blanquet et al.

[11] Patent Number: 5,156,824
[45] Date of Patent: Oct. 20, 1992

[54] APPLICATION OF DIPHOSPHONIC DERIVATIVES TO CATION EXCHANGE, NEW DIPHOSPHONIC DERIVATIVES AND PRODUCTION PROCESS THEREFOR

[75] Inventors: Pierre Blanquet, Rambouillet; Francois Ricalens, Paris, both of France

[73] Assignees: Compagnie Francaise de Mokta, Velizy-Villacoublay, France

[21] Appl. No.: 368,955

[22] Filed: Jun. 13, 1989

Related U.S. Application Data

[63] Continuation-in-part of Ser. No. 914,661, Oct. 02, 1986, abandoned, which is a division of 802,472, Nov. 27, 1985, Pat. No. 4,774,262, which is a continuation of 256,141, Apr. 21, 1981, abandoned.

[30] Foreign Application Priority Data

Apr. 27, 1980 [FR] France .................. 80 08963

[51] Int. Cl.$^5$ ............................................. C01G 56/00
[52] U.S. Cl. ............................................. 423/7; 423/10
[58] Field of Search .............. 210/682, 689, 687, 688; 521/38; 423/6, 7, 10, 21.5, 89, 139, 100, DIG. 14

[56] References Cited

U.S. PATENT DOCUMENTS

| | | | |
|---|---|---|---|
| 2,882,248 | 4/1959 | Kennedy | 210/688 |
| 3,214,454 | 10/1965 | Blaser et al. | 524/123 |
| 3,297,578 | 1/1967 | Crutchfield et al. | 524/123 |
| 3,303,139 | 2/1967 | Blaswer et al. | 252/80 |
| 3,429,824 | 2/1969 | Tate | 210/699 |
| 3,784,512 | 1/1976 | Masson et al. | 524/123 |
| 3,890,228 | 6/1975 | Hwa et al. | 210/699 |
| 4,002,564 | 6/1977 | Carbonel et al. | 210/688 |
| 4,020,091 | 4/1977 | Budnick | 524/123 |
| 4,154,674 | 5/1979 | Warshawsky et al. | 210/32 |
| 4,836,956 | 6/1989 | Kem | 423/139 |

FOREIGN PATENT DOCUMENTS

| | | |
|---|---|---|
| 0001561 | 4/1978 | European Pat. Off. . |
| 0023173 | 7/1980 | European Pat. Off. . |
| 1002355 | 2/1957 | Fed. Rep. of Germany . |
| 1171401 | 6/1964 | Fed. Rep. of Germany ...... 260/932 |
| 2322100 | 2/1976 | France . |
| 8008963 | 4/1980 | France . |
| 537086 | 11/1976 | U.S.S.R. .................. 521/31 |
| 724528 | 3/1980 | U.S.S.R. .................. 521/31 |
| 810642 | 3/1959 | United Kingdom . |

OTHER PUBLICATIONS

Chem. Abstracts, vol. 95, entry 158798N.
Chem. Abstracts, vol. 95, "phosphonic acid–bis derivatives".

*Primary Examiner*—Thurman K. Page
*Assistant Examiner*—Peter F. Kulkosky
*Attorney, Agent, or Firm*—Jacobson, Price, Holman & Stern

[57] ABSTRACT

New diphosphonic derivatives are capable of extracting the uranium in phosphoric acid with a P2O5 content ranging from 10 to 50 per unit.

The new diphosphonic derivatives have the following formula:

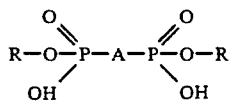

wherein R is selected from the group consisting of hydrogen and alkyl radicals having 1 to 15 carbon atoms and having at most 2 branchings in the alkyl radical, and A is a mono- or di- substituted methylene radical wherein the substituents are selected from the group consisting of an alkyl group having at most two branchings, hydroxyl, an amino group, and hydrogen, wherein the total number of carbon atoms in the R and A groups is from 15 to 50 carbon atoms, with the proviso that when A is substituted by hydroxy or amino. A has 15 to 25 carbon atoms, and wherein A is linked to a water insoluble crosslinked ion exchange resin skeleton.

6 Claims, No Drawings

APPLICATION OF DIPHOSPHONIC DERIVATIVES TO CATION EXCHANGE, NEW DIPHOSPHONIC DERIVATIVES AND PRODUCTION PROCESS THEREFOR

This application is a continuation of application Ser. No. 914,661, filed Oct. 2, 1986, now abandoned, which is a divisional application of Ser. No. 802,472, filed Nov. 27, 1985, now U.S. Pat. No. 4,774,262, which in turn is a continuation application of Ser. No. 256,141, filed Apr. 21, 1981, now abandoned.

The present invention relates to the application of diphosphonic derivatives to cation exchange, to new diphosphonic derivatives and to a process for producing them.

During the past several years, the recovery of metallic ions and purification of aqueous solutions have led to increased reliance on ion exchangers in the form of resins or in the form of liquid-liquid extraction agents.

Numerous extractive compositions are presently available on the market. However, these compositions cannot be used for the exchange of certain metallic cations when these are dissolved in extremely acid and/or highly chelating aqueous solutions.

One of the most difficult problems to resolve has been the recovery of elements of the actinide series and of certain rareearths contained in phosphoric acid solutions and, more particularly, the recovery of the uranium contained in crude phosphoric acid solutions with a $P_2O_5$ content varying between 10 and 50 percent by weight.

For this reason, one object of the present invention is to provide an extractive composition which can extract certain metallic cations that are present in certain chelating or extremely acid mediums.

A further object is to provide a composition of the above type which is capable of extracting the uranium in phosphoric acid with a $P_2O_5$ content ranging from 10 to 50 percent.

A still further object is to present a process for the recovery of the uranium in the above phosphoric medium by cation exchange, based on said compositions, with possible temperature variations from the 70° to 80° C. ambient temperature.

These objects are achieved by applying to cation exchange diphosphonic derivatives with the acid form represented by the following general G formula:

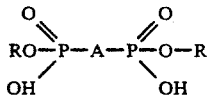

where R is selected from the group composed by alkyl remnants containing 1 to 15 carbon atoms and at most 2 branches on the primary chain, and by hydrogen, where A is a divalent organic radical selected from the group of mono-, di- or tri- substituted ethylenes and the mono- or di-substituted methylenes.

It should be noted that among the active diphosphonic groups, one group in particular has excellent extractive properties and is easily accessible. This is the diphosphonic hydroxy-methylene group.

Another equally accessible group is the diphosphonic amino-methylene group.

However, although it is more difficult to synthesize, the diphosphonic methylene group seems to be the one combining the best chemical stability with excellent extraction properties.

The derivatives according to the invention may be liquid-liquid extraction agents with a total number of carbons ranging from 7 to 50 which may be diluted in a hydrocarbonated diluant selected from the group of saturated and unsaturated aliphatic and aromatic hydrocarbons and their mixtures.

These derivatives should contain a total of 15 to 40 carbon atoms, preferably, with the most satisfactory range being from 18 to 30.

As illustrated in the examples, the extractive properties of these derivatives can vary substantially, depending on the characteristics of the A or R hydrocarbon chains. Thus, a highly branched chain and/or one which contains cyclaneor bicyclane compounds confers to the compounds resulting from synthesis a much lower lipophilic capacity than that provided by straight chains with the same number of carbons. However, it is within the bounds of the invention to consider that when there is a cyclane in a chain, that chain is the equivalent of a straight chain in which the cyclane accounts for half the carbons it contains.

A comparison can be made of the hydroxy-diphosphonated compounds obtained, as described below, by the action of phosphorus trichloride on naphtenic acid, which has, in principle, 23 carbon atoms and is highly branched, on the one hand, and on the product from paper mill waste known under its Scandinavian name, "Tallol," which is a mixture of oleic and linoleic acids, of which the straight-chain atoms have 18 carbon atoms and respectively display one and two unsaturations, on the other hand. In the first instance, the diphosphonic derivative is highly water soluble, which makes it very expensive to employ. In the second case, the solubility in an aqueous phase is very slight, less than 1/3000th. Symmetric or disymmetric diesterification plays an important two-pronqed role: It substantially reduces the water solubility of the acids obtained in this manner and causes a very significant increase in the extraction selectivity of uranium relative to iron in phosphoric mediums.

In view of what was stated above and of economic statistics, it is possible to define an inexpensive synthetic product with excellent extractive properties. This product is derived from a straight-chain fatty acid which has been subjected to diphosphonation using phosphorus trichloride, and has been subjected to diesterification. The product obtained in this manner should have an A radical with at least 8 carbon atoms, preferably between 15 and 25, and at most two branches, preferably none, with the R radical having 1 to 15 carbon atoms, preferably 8 to 12, and at most two branches.

These products possess the remarkable advantage which no other existing product for extraction of the uranium at oxidation state IV, contained in phosphoric acid, possessed of being insoluble in a base medium, which enables re-extraction using alkaline or ammonium carbonate solutions and an oxidation agent, making possible the passage of uranium from the valence of IV to the valence of VI.

The compounds according to the invention may also be ion exchange resins with active groups corresponding to the G formula.

This invention is also designed to provide new G' formula diphosphonic derivatives, characterized by the fact that they correspond to the general G formula, where A corresponds to the following formula:

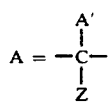

where R is selected from the group composted of the hydrogen atom and hydrocarbyl groups/radicals of 1 to 15 carbon atoms, where A' is selected from the group composed of hydrocarbyl radicals with from 1 to 30 carbon atoms and at most two branches by the side chains of a resin comprising other side chains conveyor of the G' type group, and with a phosphorus content of at least 5 percent, where Z is selected from the group composed of hydrocarbyl radicals with 1 to 30 carbon atoms and at most two branches by the amino groups (un-, mono- or di-substituted NH2), by the alcohol groups (unsubstituted or substituted OH) and by the hydrogen atom.

The G formula R radical preferably containing 8 to 12 carbon atoms and displaying at most two branches.

The total number of carbon atoms is advantageously between 10 and 50, preferably between 15 and 40, with the most satisfactory range being from 18 to 30.

Relative to known phosphorus derivatives which are capable of extracting uranium, such as OPPA, the derivatives according to the invention display the singularity of having their lipophilic properties related to the length of a chain directly linked to the phosphorus by carbon-phosphorus bonds and located between the two phosphorus atoms. That is why limitations at the A group level are the strictest, that is, they must advantageously have at least 8 carbon atoms, and preferably from 15 to 25 atoms. These derivatives also have the added advantage of displaying great stability relative to acid reagents, and hydrofluoric acid in particular.

Finally, it should be noted that when Z is hydrophilic, that is, when it is from the amino or hydroxyl groups, and when this is not compensated by a loss of hydrophilic capacity by partial esterification of the phosphonic acid groups, it is necessary for the A' group to have at least 14 carbon atoms in order to obtain satisfactory lipophilic properties.

With regard to the new derivatives formed by the ion exchange resins according to the invention, they are preferably characterized by the fact that the resin is selected from the group composed of acrylic resins and reticulated polystyrenes.

The ratio of phosphorus to weight of resin is preferably between 10 and 25 percent.

An additional object of the invention is to provide it with a process for synthesizing the new derivatives according to the invention.

The synthesis of G formula derivatives described above, which are fat-soluble and can thus be classified as micro-molecules, may be achieved by making use of homogeneous single phase reactions familiar to the specialist in phosphorus chemistry. These reactions are illustrated by the equations set forth below, where the R, R' and R" radicals are different from those expressed in the G formula, and where X represents one halogen atom.

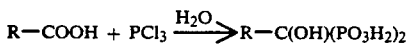

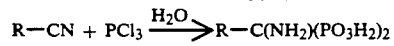

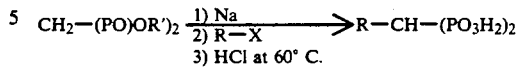

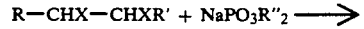

The stoichiometry of these reactions is not observed.

With respect to esterification of the diphosphonated solvents, it may be achieved by the action of the corresponding alkyl orthoformate, according to a method of operation identical to that used for esterification of carboxylic acids.

All of the fat-soluble derivatives according to the invention were produced according to the techniques described above.

When the diphosphonic derivatives are resins, the preferred method of synthesis consists of grafting diphosphonic groups onto a resin conveyor of carboxylic acid functions, in a conventional manner.

Another method involves preparing diphosphonic monomers, polymerizing them and reticulating the resulting polymer so as to transform it into a resin.

When one uses the grafting method, one may employ either the reactions described above, simply transposed to the case of resins, or implement a specially designed process for preparing the resins according to the invention. In the first instance, one usually obtains resins with a low phosphorus load; in the second instance, one obtains resins with a considerably high weight ratio of phosphorus, normally ranging from 10 to 25 percent, which produces diphosphonic derivatives with a very efficient performance relative to cation exchange.

Therefore, this invention also relates to a process for synthesizing diphosphonic resins with a weight ratio of phosphorus ranging from 10 to 25 percent by weight.

This process displays three essential aspects. The first concerns the degree of dryness of the resin used at the outset. In this regard, it is imperative to dry the resin in a thorough manner. Azeotropic driving away of humidity with benzene is an adequate method. A more efficient method or an additional drying treatment is advantageous although not essential. The second important aspect of the process concerns the nature of the solvent employed. The solvent must be inert, it must allow for a future reaction in a homogeneous medium, and, preferably, it displays ether bridges. The polarity of the solvent is not a critical factor.

However, the use of a solvent, the dielectric constant of which is between 2 and 10 at 25° C. is advantageous. Similarly, it is preferable to use solvents, the boiling point of which is higher than the reaction temperature, between 90° and 140° C. Solvents with a lower boiling point may nonetheless be employed, even if it means carrying out the reaction under pressure. Finally, the third important aspect of the process is the temperature employed: One works preferably between 90° and 120° C., without exceeding approximately, 140° C. Indeed, it has been noted that, in spite of the thermal fragility of carboxylic termination type resins, the use of these temperatures is a very good parameter, not only from the standpoint of kinetics, but also from the viewpoint of the rate of substitution. The ability of the resins to withstand several cycles under the conditions described above appears to be surprising and is attributed to the selection of the specific conditions achieved.

Hence, one can thus alter any resin containing carboxylic groups, such as acrylic resins or resins of iminodiacetic groups derived from reticulated polystyrenes.

Another object of this invention is to provide new compositions which can make possible the extraction of various metallic cations with solvents.

Indeed, the fat-soluble derivatives according to the invention are difficult to dissolve in the hydrocarbonated diluents conventionally employed in the trade, and especially those that enable use up to 60°–80° C. and only dissolve well in certain aromatic carbons such as toluene, which is highly toxic, and/or in fairly flammable polar diluents such as ether and various carboxylic esters.

This is why, during the study which produced this research, we sought to develop diluents capable of dissolving these compounds, the primary component of which is a non-aromatic hydrocarbon.

Hence it could be proven that adding a water-immiscible lipophilic polar compound in proportions ranging from 1 to 20 percent, made it possible to satisfactorily dissolve the compounds according to this invention.

These lipophilic, water-immiscible polar compounds may be especially alcohol, ketones, phosphoric acid triesters, sulfones, sulfoxides, halogenated derivatives, tri-alkyl-phosphine oxides. They may also be long chain carboxylic acids such as those that are subjected to hydroxydiphosphonation to produce one of the derivatives according to the invention.

However, it is more practical to employ primary, secondary or tertiary alcohols, the number of carbons of which is between 5 and 12, preferably between 6 and 10.

Octanol-2, more commonly called caprylic alcohol, and dodecanol are perfectly suited, in proportions ranging from 2 to 20 percent, preferably from 3 to 10 percent.

It should be noted here that these lipophilic, waterimmiscible polar compounds have an effect on the behavior of the derivatives according to the invention, and that their extractive power tends to diminish when the concentration in said polar compound increases, the respective selectivity among the various cations also varies. In the case of uranium extraction with solvent, said compounds also lead to extraction of phosphoric acid, especially when the latter is highly concentrated, This is why the compositions according to this invention are made of solutions of 0.01 M to 0.2 M of a derivative corresponding to the G formula, dissolved in a preferably nonaromatic, hydrocarbonated diluent, and in a lipophilic, water immiscible polar compound selected from the group composed of alcohols, ketones, phosphoric acid triesters, sulfones, sulfoxides, halogenated derivatives, tri-alkyl phosphine oxides and long chain carboxylic acids (7 to 30 carbon atoms, preferably 15 to 25).

One can select hydrocarbonated diluents from those that are commercially sold by oil companies, one can mention especially a product sold by the "ESSO" corporation under the name of "EXSOL D 100" or ESCAID 120.

With regard to the process for recovering the uranium present in phosphoric acid, in the case of use of solvents it suffices to use the contact techniques developed in the wellknown case of octyl-pyrophosphoric acid, better known by its acronym, OPPA, the elution then being performed by contact with hydrofluoric acid.

However, extraction techniques are much easier in the case of use of extractants according to this invention, particularly in the case of diesterified compounds according to the invention. Indeed, even in the presence of rather high concentrations of ferrous iron, one observes very few emulsions.

In addition, these compounds are capable of extracting uranium even with a very high $P_2O_5$ concentration, such as the one marketed containing 50 percent by weight.

With respect to re-extraction, it is possible to re-extract with sulfuric solutions of iron sulfate. However, the kinetics of these re-extractions is slow. In the case of diesterified compounds, it is, on the other hand, possible to re-extract uranium with sodium and/or ammonium carbonate solutions, and an oxidizing agent capable of oxidizing uranium IV in the solvent into uranium VI. Said oxidizing agent may be hydrogen peroxide. The concentration of sodium carbonate may vary from 0.5 to the solumility limit of that carbonate. For the other alkaline or ammonium carbonates, the same limitations apply.

With regard to basic re-extraction techniques and solutions which are capable of re-extracting the uranium present, one may employ the methods disclosed and/or mentioned in the French patent applications N° 77/25889, 78/25815, 79/04760 and 72/04761, filed by MINEMET RECHERCHE.

In the case of use of resins, one puts the resin in contact with the uraniferous phosphoric acid, chemically reduced or not, then one elutes it in an oxidizing medium using alkaline or ammonium carbonate solutions of 10 to 200 grams per liter.

This kind of re-extraction, however, probably because of the presence of hydrogen peroxide, tends to alter the resin and to reduce the quantity of active groups within this resin. For this reason, it is preferable to employ other techniques which also display the advantage of not having to neutralize the saturating acidity of phosphoric acid. Thus, it was shown that one could elute, the resins with concentrated ferrous sulfate solutions in the presence of some sulfuric acid (0.1 N to 1 N) to prevent precipitation of this salt.

The products according to the invention, resins or solvents, provide excellent extractive properties for many metals for which few extractants in an acid medium were known. Among the cations that are easily extracted are the group of metals with an f sub-layer as well as yttrium and therefore elements of the lanthanide and actinide series. They provide a fairly high potential for the alkaline earth elements and for various trior tetravalent transmission elements. In particular, lead is selectively extracted as compared to zinc and copper the two latter elements are also extracted, but at less significant acidity levels.

The derivatives according to the invention also extract uranium in its VI form, although its separation coefficients, for solvents at least, are less favorable than for uranium IV. On the other hand, with regard to the resins according to the invention, the fixing of uranium VI is excellent because it is possible to fix significant quantities of uranium VI in the presence of a very large excess of ferrous iron. This phenomenon may be due to the fact that the metallic ions in the resin can be liganded only once, at the very most twice, whereas in liquid phase the cations may be liganded as often as necessary.

As an illustration, uranium IV seems to be bonded in extraction phenomena where there are fat-soluble, di-esterified products according to the invention. In other words, it is considered as having two ligands, whereas iron III would form a compound introducing two ferrous ions and three molecules of extraction agent.

The following examples, not constituting limitations to the invention, are designed to enable specialists to easily determine the operating conditions that are appropriate for use in each specific case.

EXAMPLE 1

Preparation of alkyl-methylene-diphosphonic acid

I. Preparing the sodium derivative of the ester (1a)

One works on equi-molecular quantities of ester and sodium.

In a flask, equipped with a thermometer, a metal agitator driven by an electric motor, a bromine funnel and a coolant, one disperses 1.6 g of Na in 15 ml of anhydrous toluene heated for flow-back under vigorous agitation. Then this mixture is cooled to 20° C. and one adds, with the funnel, 24.3 g of isopropyl methylenediphosphonate, 1a, containing the reaction mixture between 20 and 30° with an acetone dry ice bath until complete disappearance of the sodium.

II. Alkylation of the sodium derivative. Preparation of isopropyl benzyl-methylene diphosphonate, 1b One adds on site to the sodium derivative dissolved in the toluene heated to 100°, 11 ml of benzyl bromide. One continues to heat it at 60° for one hour. Then, the toluene in the vacuum of the water pump is evaporated 50 ml of technical hexane and 50 ml of water are added. Then, this mixture is decanted into a beaker. The organic phase in the hexane is separated from the aqueous phase in 50 ml portions of hexane. The hexane-containing phase is then washed with water until all traces of bromine derivatives have disappeared from the washing water (test with $NO_3Ag$). The organic phase is dried on anhydrous sodium sulfate. Then the solution is evaporated under vacuum.

The expected 14.6 g of 1b ester is obtained by distillation of the crude product. The residue contained in the flask (3.4g) is composed of a mixture of benzyl-methylene diphosphonic acids (diacids and triacids). Production by alkylation of the 1b ester = 60 percent. The formation of benzyl-diphosphonic acids may be explained by hydrolysis of the 1b ester during extraction and washing of the organic phase.

III. Hydrolysis of the 1b ester. Preparation of benzyl-methylene diphosphonic acid, 2b.

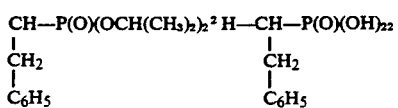

1.5 g of 1b ester and 11 ml of concentrated hydrochloric acid are heated by reflux for 3 hours. Then, the acid and water under vacuum are evaporated and, to the thickened mass, 15 ml of isopropyl alcohol are added, and distillation occurs under vacuum to remove the acid water. This operation is repeated 3 times. Finally, the crystals are dried under vacuum in a dessicator. The production of acid is quantitative.

The method developed for synthesizing the 1b ester, the sodium derivative of the 1a ester and the 2b acid was successfully applied in synthesizing the heptyl, dodecyl, hexadecyl, methylene-diphosphonic esters and corresponding acids.

With regard to the dialkyl ester

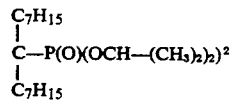

we were able to obtain it easily based on the sodium derivative of the monoheptylic ester. Dialkylation is obtained with a 27 percent production.

Hydrolysis of the isopropylic esters of the diphosphonic acids into corresponding acids is achieved easily and with good results; that is the reason why we selected them.

The analytic method employed in following these syntheses was RMN spectrography of the proton. Routine spectrums registered on a Varian E.M. 360 V device, based on solutions in the carbon tetrachloride, with the TMS as internal reference.

The characteristic signals for the esters are:

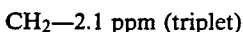

$CH_2$—2.1 ppm (triplet)
$CH$—$(CH_3)_2$—4.7 ppm (7 divided lines)
$CH_3$ —$CH$—1.2 ppm (J doublet = 7 Hz)

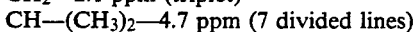
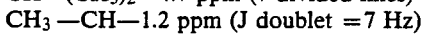
$C_6H_5$ - 7,2 ppm
$CH$—$(CH_3)_2$ - 4,7 ppm (7 divided lines)
$CH_3$ - 1,3 ppm
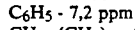
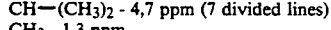
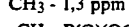
$CH_3$—$(CH_2)_6$ - 0,9 ppm
$CH$—$(CH_3)_2$ - 4,65 ppm (7 divided lines)
$(CH_3)$—$CH$ - 1,3 ppm (doublet J = 6 Hz)
et 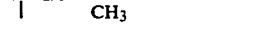
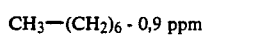
$CH_3(CH_2)_n$ - 0,85 ppm
$CH$—$(CH_3)_2$ - 4,7 ppm (7 divided lines)
$(CH_3)$—$CH$ - 1,3 ppm (doublet J = 8 Hz)
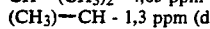
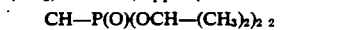
$\underline{CH_3}$—$(CH_2)_6$ - 0,9 ppm
$\underline{CH}$—$(CH_3)_2$ - 4,75 ppm (multiplet)
$(\underline{CH_3})_2$—$CH$ - 1,3 ppm (doublet)

With regard to the methylene-diphosphonic acids, RMN spectrography shows that the isopropylic protons disappear at 1.3 ppm methyl doublet and at 4.7 ppm CH—CH solid, and the low field signals due to the acid protons appear which allows for control of partial or total hydrolysis.

Example 3.

Hydroxy-phosphonization of acid sold by the SHELL corporation under the name of naphtenic acid Seven molecules of naphtenic acid to two molecules of phosphorus trichloride ($PCl_3$) are subjected to reaction according to the techniques described in Belgian patent N° 619 600. The reaction product is then diluted to 30% of kerosene, then the mixture is put in contact with a phosphoric acid solution at 30% of $P_2O_5$ containing 100 mg/liter of uranium. The major part of the uranium is extracted, whether the solution is reduced or not.

EXAMPLE 4

Diphosphonation test of the product known under the name of "Tallol"

We proceed as in the previous example.

EXAMPLE 5

Diesterification of the products obtained by following examples 3 and 4

These products are mixed with a very large excess (twice the stoichiometric quantity) of ethyl or methyl orthoformiate, depending on the ester desired. During this operation, two functions of the hydroxy-diphosphonic acids and the acid function of the tallol or of naphtenic acid are esterified. One proceeds according to conventional methods of organic chemistry for esterification using alkyl orthoformate. Once the reaction is achieved, one evaporates the solvents using a device commonly known as a "rotavapor," then drawing under vacuum using a vane pump. As shown in nuclear magnetic resonance studies, the sediment is composed of practically pure diesterified hydroxy-diphosphonic products.

This is the manner in which the methylated derivative of naphtenic acid and the ethylated derivative of the product obtained from the Tallol were prepared.

EXAMPLE 6

Hydroxy-diphosphonization of the product sold under the tradename of C 464 DIAPROSIM We sought to remove the excess water contained in the resin either by pretreating it with anhydrous dioxane, or by using a large excess of $PCl_3$.

Mode of operation:
Resin: 5 ml
anhydrous dioxane: 50 ml
Heat 30 minutes at about 100° C.
Filtration on sintered over heat. Drying by maintaining suction for 5 minutes
Decant the dry product into a test tube. Add:
Dioxane: 2 ml
$PCl_3$: 0.9 ml
Heat in a boiling water bath for 2 hours.
Recover by $H_2O$, filtration, washing, drying.

Several resin samples were treated in this manner and the resins obtained were placed in contact with 30 percent phosphoric acid solutions containing 100 mg of uranium in reduced form (90 percent iron in the form of $Fe^{2+}$). When restored to a concentration per kilogram of resin of one mole of hydroxymethylene-diphosphonic group, the resin has a separation coefficient between the resin phase and the aqueous phase of about 80 and a saturation capacity on the order of 70 g/kg of resin.

In addition, all of the compounds described in examples 1 and 2 were tested on the same solution, and all of these showed a very high uranium extraction activity.

Other tests showed that in addition to uranium, it is possible to extract other divalent metal, particularly from the actinide and lanthinide series.

EXAMPLE 7

Extraction of elements other than uranium using the derivative obtained in Example 3

Composition of the aqueous phases and form in which the elements were introduced.

The selected elements were dispersed in two solutions with pH 1, $S_1$ and $S_2$ contain approximately 100 mg/l of each element.

| $S_1$ | $S_2$ |
|---|---|
| Pb—$PbCl_2$ | V—$V_2O_5$ |
| Zn—$ZnCl_2$ | Mo—$MoO_3$ |
| Cu—$CuCl_2$ | In—$InCl_3$ |
| Ni—$NiCl_2$ | Bi—$BiCl_3$ |
| Co—$CoCl_2$ | Sn—$SnCl_2$ |
| Cr—$CrCl_3$ | Tl—$TlCO_3$ |
| Sb—$SbCl_3$ | Ca—$CaCl_2$ |
| Ga—$GaCl_3$ | Cd—$CdCO_3$ |
| La—$LaCl_3$ | Hg—$HgCl_2$ |

| | $S_1$ initial | $S_1$ after contact | $S_2$ initial | $S_2$ after contact |
|---|---|---|---|---|
| Cu | 100 | 50–75 | 100 | 100 |
| Fe | ND | ND | | |
| Ga | 100 | ND | | |
| Zn | 100 | 100 | | |
| Co | 100 | 50 | | |
| Ni | 100 | 75 | | |
| Cr | 100 | 100 | 100 | ND |
| La | 100 | ND | | |
| V | | | 100 | 50 |
| Cd | | | 100 | 80–90 |
| In | | | 100 | ND |
| Mo | | | 100 | ND |
| Tl | | | 100 | 50 |
| Hg | | | 100 | 100 |
| Sn | | | ND | ND |
| Bi | | | TP | ND |
| Th | | | TP | ND |
| Ca | | | 100 | 90–100 |
| Sb | ND | ND | | |

TP = possible traces
ND = not detected

Composition of the organic phase 0.1 M diphosphonic derivative. in Exsol D 100 +5 % octanol by volume Conditions and method of operation of the tests Organic phase and aqueous phase contacts were made in decanter phials with:
O/A =1/10
contact time: 10 mn
ambient temperature Results The elements are dosed semi-quantitatively, by X fluorescence, in the aqueous phases before and after contact with the organic phase.

The preceding table shows the quantity of element present as a percentage relative to the initial solutions (base 100 %). Note: The initial organic phase should contain traces of copper and iron (probably mg/l).

EXAMPLE 8

Extraction test for uranium in phosphoric medium using the hydroxy-diphosphonic compounds resulting from the reaction of phosphorus trichloride on the Tallol Organic phases containing 0.1 mole per liter of reagent dissolved dissolved in the solvent sold by ESSO under the trade name of ESCAID 120, with additions of 5% octanol, are placed in contact with solutions of uranium and iron dissolved in phosphoric acid at 30 % of $P_2O_5$. The iron is introduced in the form of Mohr's salt and the uranium in the form of uranium IV, dissolved in a 1 N solution of sulfuric acid.

The duration of the contact, which was set at 30 minutes, is much higher than that needed to attain equilibrium (5 minutes).

In these experiments, the concentration of uranium is varied in the initial aqueous phase.

The first table corresponds to the product obtained from the Tallol without modification and containing additionally, residual Tallol (approximately the same quantity, expressed in moles, as that of the hydroxy-diphosphonic reagent (see example 4). The second table corresponds to the reagent obtained from the Tallol and subjected to an esterification reaction, which leads to a diethylated ester of the hydroxy-diphosphonic acid. This product contains little or no residual Tallol (see example 5).

TABLE 1

| | Aqueous Phase | | | Organic Phase | | |
|---|---|---|---|---|---|---|
| FeII/ Fe tot. (%) | U introduced (mg/l) | U equilibre (mg/l) | R | U equilibre (mg/l) | $K_d$ | |
| 100 − | 20 | <10 | L8 | 200 | >20 | |
| 100 − | 500 | <10 | L8 | 5000 | >500 | |
| 100 − | 1000 | 260 | L8 | 7400 | 28 | |
| 50% | 100 | 50 | L8 | 500 | 10 | |

TABLE 2

| | Aqueous Phase | | | Organic Phase | | |
|---|---|---|---|---|---|---|
| FeII/ Fe tot. (%) | U introduced (mg/l) | U equilibre (mg/l) | R | U equilibre (mg/l) | $K_d$ | |
| 100 − | 20 | <10 | L9 | 200 | >20 | |
| 100 − | 500 | <10 | L9 | 5000 | >500 | |
| 100 − | 750 | 75 | L9 | 6860 | 91 | |
| 100 − | 1000 | 180 | L9 | 8200 | 45 | |
| 100 − | 2000 | 1470 | L9 | 8440 | 6 | |
| 50% | 100 | 30 | L9 | 700 | 23 | |

EXAMPLE 9

Study of the influence of the Octanol and the rate of reduction on uranium extraction by the diesterified hydroxydiphosphonic compound obtained from the Tallol The phosphoric acid employed is the same as that described in the preceding example. However, the iron was introduced in the form of Mohr's salt and ferrous sulfate, in such a way that the total quantity of dissolved iron remains constant and so as to obtain the rate of reduction specified in the following tables.

The first table corresponds to the use of a solvent containing 0.1 M of the diesterified diphosphonic compound. The second table corresponds to a concentration of 0.05 M of the same compound. The Octanol content of the organic phase was made to vary.

TABLE 1

| FeII Fe tot. % | Oc- tanol % | Aqueous Phase $U_A$ (mg/l) | Organic Phase | | | | |
|---|---|---|---|---|---|---|---|
| | | | $U_O$ (mg/l) | $Fe_O$ (mg/l) | P (g/l) | $K_dU$ | S U/Fe |
| 90 | 5 | 265 | 6530 | 680 | 7,19 | 24,6 | 54 |
| 80 | 5 | 325 | 5890 | 930 | 6,94 | 18,1 | 58 |
| 100 − | 15 | 205 | 6900 | 190 | 6,84 | 33,7 | — |
| 90 | 15 | 280 | 6250 | 500 | 6,84 | 22,3 | 67 |
| 80 | 15 | 315 | 5800 | 660 | 6,84 | 18,4 | 84 |

TABLE 2

| FeII Fe tot. % | Oc- tanol % | Aqueous Phase $U_A$ (mg/l) | Organic Phase | | | | |
|---|---|---|---|---|---|---|---|
| | | | $U_O$ (mg/l) | $Fe_O$ (mg/l) | P (g/l) | $K_dU$ | S U/Fe |
| 90 | 5 | 160 | 2980 | 350 | 3,21 | 18,6 | 80 |
| 80 | 5 | 190 | 2680 | 450 | 3,21 | 14,1 | 94 |
| 100 − | 15 | 125 | 3390 | 110 | 3,49 | 27,1 | — |
| 90 | 15 | 165 | 3040 | 290 | 3,46 | 18,4 | 95 |
| 80 | 15 | 180 | 2740 | 381 | 3,51 | 15,2 | 120 |

$K_dU$ = separation coefficient $U_O/U_A$
S U/Fe = selectivity coefficient of uranium relative to iron:
$$\frac{U_A/Fe_A}{U_O/Fe_O}$$

EXAMPLE 10

Solubility test of solvents obtained from the Tallol

The modified organic phases containing 0.1 M of the derivatives obtained from Tallol, diethylated or not, were placed in contact with aqueous phases composed of 30 percent phosphoric acid, with the relationship between the two phases equal to 1.

The results for the two solvents show a loss of less than 1/3000th.

EXAMPLE 11

Re-extraction test of the uranium contained in the organic phases using hydrofluoric acid.

An organic phase containing 0.05 M of diphosphonic compound obtained from Tallol and diesterified, loaded at 4.2 grams per liter of uranium is placed in contact with variable quantities of percent hydrofluoric acid. With an O/A or 40, 80 percent of the uranium is already precipitated in its tetrafluoride form. With an 0/A of 3, 99 percent of the uranium is recovered.

These results could be improved if, prior to conducting the re-extraction, the organic phase were washed to rid of it of the dissolved phosphoric acid, for instance with concentrated sulfuric acid.

The organic phase thus regenerated was again placed in contact with an aqueous phase containing 30 percent phosphoric acid, 15 grams per liter of totally reduced iron. The load obtained after one contact examples to reach the saturation level and to show that, despite a contact period of more than one day with 50 percent hydrofluoric acid, the diphosphonated product did not witness its extraction properties altered.

EXAMPLE 12

Comparative reset of the esterified and non-esterified products

Solutions of 30 percent phosphoric acid are placed in contact with an organic phase containing naphthenic acid after hydroxy-diphosphonation and the product stemming from esterification of the first product. The contents are indicated in the following table, along with the extraction results.

|  | Non esterified derivative | | | Esterified derivative | | |
|---|---|---|---|---|---|---|
|  | U g/l | Fe g/l | P g/l | U g/l | Fe g/l | P g/l |
| Initial aqueous phase | 0,15 | 14,2 | — | 0,15 | 14,2 | — |
| Unloaded organic phase |  |  | 3,67 |  |  | 2,70 |
| Loaded organic phase | 1,30 | 1,01 | 3,38 | 1,03 | 0,55 | 2,70 |
| Used aqueous phase | <50 mg/l | 14,2 |  | <50 mg/l | 14,5 | — |

EXAMPLE 13

Urandium fixing test by percolation on a resin bed

A resin, prepared as described in Example 6 and containing 9 percent of phosphorus by weight after acid-base formative cycles, is placed in a column, and a solution of phosphoric acid at 30 percent of $P_2O_5$ with the following composition total 2 g/l Fe, rate of reduction of Fe 50 % uranium content *(at 124 mg/l is percolated at a speed of 6 by (volume of the resin bed per hour). The resin is then rinsed under counter current and is finally eluted at co-current by a solution of 100 g/l of ferrous sulfate at a rate of one by per hour.

All of these operations are performed at a temperature of 60° C.

During the first 20 by, there is no trace of uranium detectable by analysis. Later, the uranium content of the phosphoric solution after percolation slowly increases.

Once the initial concentration is reached (approximately 120 bv), the total quantity of fixed uranium, which is equal to about 10 g/l is calculated.

After percolation, 95 percent of the fixed uranium can be recovered by elution.

However, the content in the eluent does not exceed 0.7 g/l, which is probably due to the slowness of exchange between the resin and the solution and the slowness of oxidation of uranium IV into uranium VI.

EXAMPLE 14

Uranium fixing test at various $P_2O_5$ contents and at various oxidation rates

These tests were conducted on the resin produced according to the description in Example 15.

2 ml of puffed resin, subjected to acid-base activation and formative cycles, are placed in beakers in contact with 40 ml of phosphoric solution containing uranium and iron at a state of oxidation specified in the following table.

|  | cation state | | U mg/l | Fe g/l | $SO_4^-$ g/l | $P_2O_5$ g/l |
|---|---|---|---|---|---|---|
|  | Fe | U |  |  |  |  |
| S.I. | $Fe^{II}$ | $U^{IV}$ | 410 | — | — | — |
| S.F. | $Fe^{II}$ | $U^{IV}$ | 100 | — | — | — |
| S.I. | $Fe^{II}$ | $U^{IV}$ | 505 | 24,1 | 77,8 | 632 |
| S.F. | $Fe^{II}$ | $U^{IV}$ | 190 | 23,3 | 78,5 | 635 |
| S.I. | $Fe^{III}$ | $U^{VI}$ | 405 | — | — | — |
| S.F. | $Fe^{III}$ | $U^{VI}$ | 240 | — | — | — |
| S.I. | $Fe^{III}$ | $U^{VI}$ | 495 | 26,7 | 99,0 | 694 |
| S.F. | $Fe^{III}$ | $U^{VI}$ | 380 | 26,7 | 101 | 713 |

EXAMPLE 15

Synthesis example 50 g of DUOLITE ES 466 resin, marketed by the DIAPROSIM company, are passed through a column, in acid form and by percolation using 2 liters of hydrochloric acid 1 M. The resin is rinsed freely with a benzene azeotrope.;2 0 ml of DIOXANE, 30 g of dry resin, were allowed to rise. Under agitation, over the soaked resin were poured 11.2 ml of water (or 0.63 mole), and slowly 34.ml. of $PCl_3$ (or 0.4 mole). The temperature is brought to 95° C. and the medium was maintained at this temperature for 3 hours. At the end of this period, the mixture is cooled at about 60° C. and another 11.2 ml of water and 34 ml of $PCl_3$ are added, the mixture is heated at 95° C. for three hours. A sample is taken from the resin obtained and is washed with demineralized water, then dried by distillation with a benzene azeotrope. This resin already contained a 10 percent rate of phosphorus by weight. The cycle described above was repeated on the remaining mixture, and, after rinsing and drying as previously indicated, 42 g of resin were obtained with a phosphorus content of 16.5 percent by weight, in the form of hydroxy-diphosphonic sites.

The resin used at the outset is a resin of the polystyrene type carrier of imino-diacetic groups and reticulated with divinylbenzene.

EXAMPLE 16

Extraction test for miscellaneous elements using hydroxy-diphosphonated resin and solvent after hydroxy-diphosphonation and di-esterification of the Tallol

| Element Sol.A.H$^+$ = 0,3 N | Element Sol B/H$^{+2}$ N | Extraction result | | |
|---|---|---|---|---|
|  |  | Resin | L8 0,1 N | L9 0,1 N |
| V(IV) |  | 100% | 100% | 100% |
| MnII |  | 50% | 100% | 100% |
| Co(II) |  | ≈0 | ≈50% | ≈50% |
| Ni(II) |  | ≈0 | ≈0 | ≈0 |
| Cu(II) |  | 50% | 75% | 75% |
| Zn(II) |  | 10-15% | 40% | 60% |
| Ga(III) |  | 100% | 100% | 100% |
| Ge(II) |  | 85% | 100% | 100% |
| Cd(II) |  | 50% | ≈80% | 50% |
| Im(III) |  | 100% | 100% | 100% |
|  | Mo(VI) |  | 100% | 100% |
|  | Hg(II) |  | 50%* | 30% |
|  | Pb(II) |  | 100% | 100% |
|  | Bi(III) |  | 100% | 100% |

*doubtful
Resin = resin of Example 15 after diphosphonation
L8 = hydroxy-diphosphonic acid derived from Tallol
L9 = diethylic ester of L8
L8 and L9 are dissolved in ESCAID 120 containing 5% octanol

I claim:

1. A process for recovering metallic cations contained in an acidic or complexing aqueous solution comprising the steps of:

preparing a resin bed containing a water insoluble ion exchange resin having a crosslinked, three-dimensional resin skeleton and an active group of the formula:

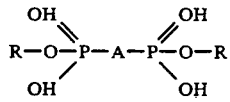

wherein R is selected from the group consisting of hydrogen and an alkyl radical having 1-15 carbon atoms and having at most two branchings in the alkyl group, and A is

Z is selected from the group consisting of alkyl radicals having 1-30 carbon atoms and having at most two branchings, an amino group, hydroxy and hydrogen, and A' provides a link binding the active group to the resin skeleton.

passing therethrough said solution containing the metallic cations at a rate suitable for the complexing of the said cations, and recovering the cations so complexed by elution of the resin bed.

2. The process of claim 1, wherein the metallic cations are actinide, rare earth, tri- or tetravelent transition cations, lead, zinc, nickel or cadmium.

3. The process of claim 1, wherein the elution is conducted using an alkali metal or ammonium carbonate solution.

4. The process of claim 1, wherein the aqueous solution is a phosphoric acid solution with a $P_2O_5$ content of 10 to 50%.

5. The process of claim 4, wherein the phosphoric acid solution is reduced.

6. The process of claim 5, wherein 50 to 90% of the iron in the phosphoric acid solution is in the ferrous state.

UNITED STATES PATENT AND TRADEMARK OFFICE
CERTIFICATE OF CORRECTION

PATENT NO. : 5,156,824
DATED : October 20, 1992
INVENTOR(S) : Pierre BLANQUET et al.

It is certified that error appears in the above-identified patent and that said Letters Patent is hereby corrected as shown below:

On the title page, item [30], the date of the French Priority should be -- April 21, 1980 --.

Signed and Sealed this

Seventh Day of December, 1993

Attest:

Attesting Officer

BRUCE LEHMAN

Commissioner of Patents and Trademarks